(12) United States Patent
Zhao et al.

(10) Patent No.: US 12,013,041 B2
(45) Date of Patent: Jun. 18, 2024

(54) MULTI FLUID PATH SELECTOR VALVE AND INTEGRATED MULTICHANNEL FLUID PATH MODULE

(71) Applicant: Beijing Zhongshan Golden Bridge Biotechnology Co., Ltd., Beijing (CN)

(72) Inventors: Zichang Zhao, Beijing (CN); Shiliang Zhou, Beijing (CN); Guanghao Li, Beijing (CN); Haiyang Zhang, Beijing (CN); Fei Zhao, Beijing (CN)

(73) Assignee: Beijing Zhongshan Golden Bridge Biotechnology Co., Ltd., Beijing (CN)

( * ) Notice: Subject to any disclaimer, the term of this patent is extended or adjusted under 35 U.S.C. 154(b) by 188 days.

(21) Appl. No.: 17/577,327

(22) Filed: Jan. 17, 2022

(65) Prior Publication Data

US 2022/0136611 A1 May 5, 2022

Related U.S. Application Data

(63) Continuation of application No. PCT/CN2020/104914, filed on Jul. 27, 2020.

(30) Foreign Application Priority Data

May 6, 2020 (CN) .......................... 202010373188.X

(51) Int. Cl.
*F16K 11/22* (2006.01)
*B01L 3/00* (2006.01)
(Continued)

(52) U.S. Cl.
CPC .......... *F16K 11/0853* (2013.01); *B01L 3/567* (2013.01); *F16K 11/22* (2013.01); *F16K 27/003* (2013.01); *G01N 35/1097* (2013.01)

(58) Field of Classification Search
CPC . F16K 11/22; F16K 11/24; F16K 1/22; F16K 1/24; Y10T 137/87877;
(Continued)

(56) References Cited

U.S. PATENT DOCUMENTS 3,552,436 A * 1/1971 Stewart .................... F16K 11/22
137/883
5,226,449 A * 7/1993 Zimmerly ............. F16K 43/001
137/240

(Continued)

FOREIGN PATENT DOCUMENTS

| WO | WO-2005033565 A1 * | 4/2005 | .............. F16K 11/22 |
| WO | WO-2018109036 A1 * | 6/2018 | .............. F16K 11/22 |
| WO | WO-2021031785 A1 * | 2/2021 | .......... F16K 11/0856 |

OTHER PUBLICATIONS

"International Search Report (Form PCT/ISA/210) of PCT/CN2020/104914," mailed on Feb. 19, 2021, with English translation thereof, pp. 1-4.

*Primary Examiner* — Hailey K. Do
(74) *Attorney, Agent, or Firm* — Cooper Legal Group, LLC

(57) ABSTRACT

The present application relates to a multi fluid path selector valve, including a valve body, and several fluid outlet pipes. The valve body is provided with several layers of branch channels therein, the branch channel includes a fluid inlet hole and several branch holes. The valve body is provided with communication holes therein for one-to-one communicating the branch holes with the fluid outlet pipes. The valve body is provided with a control mechanism to control the on or off state between the branch hole and communication hole, and the valve body is provided with fluid inlet pipes in communication with the fluid inlet holes respectively.

10 Claims, 8 Drawing Sheets

(51) Int. Cl.
*F16K 11/085* (2006.01)
*F16K 27/00* (2006.01)
*G01N 35/10* (2006.01)

(58) Field of Classification Search
CPC ..... Y10T 137/87885; Y10T 137/86163; Y10T 137/4807; Y10T 137/4857
See application file for complete search history.

(56) References Cited

U.S. PATENT DOCUMENTS

| | | | |
|---|---|---|---|
| 5,469,880 A * | 11/1995 | Zimmerly | F16K 1/446 |
| | | | 137/240 |
| 7,302,958 B2 * | 12/2007 | Worczinski | C12C 11/006 |
| | | | 137/255 |
| 7,418,978 B2 * | 9/2008 | Chao | F16K 27/003 |
| | | | 137/884 |
| 8,746,284 B2 * | 6/2014 | DeDontney | C23C 16/45574 |
| | | | 137/884 |

* cited by examiner

MULTI FLUID PATH SELECTOR VALVE AND INTEGRATED MULTICHANNEL FLUID PATH MODULE

CROSS-REFERENCE TO RELATED APPLICATION

This application is a continuation of PCT application serial no. PCT/CN2020/104914, filed on Jul. 27, 2020, which claims the priority and benefit of Chinese patent application serial no. 202010373188.X, filed on May 6, 2020. The entirety of the above-mentioned patent applications are hereby incorporated by reference herein and made a part of this specification.

TECHNICAL FIELD

The application relates to a field of an immunohistochemistry staining machine and in particular, relates to a multi fluid path selector valve and an integrated multichannel fluid path module.

BACKGROUND ART

Fully automatic immunohistochemistry stainer is applied in an automatic immunohistochemistry (IHC) staining operation of histopathological sections, which includes the operations of automatic dewaxing, repair, sample addition, incubation, final color development, etc.

Fully automatic immunohistochemistry stainer is mainly composed of multiple staining areas, multiple cleaning mechanisms, multiple sample addition mechanisms, reagent area for placing various main reagents and multiple fluid path modules for delivering the reagent to the sample addition mechanism. Referring to FIG. 1, it is a fluid path module of an existing fully automatic immunohistochemistry stainer, including a selector valve 6 and a sample addition pump 4. The selector valve 6 includes multiple fluid inlet connectors 61 and one fluid outlet connector 62. And the fluid inlet connectors 61 of the selector valve 6 are in communication with reagent bottles 5 containing a reagent through plastic communicating pipes respectively. The fluid outlet connector 62 of the selector valve 6 is in communication with fluid inlet of the sample addition pump 4 through a communicating pipe.

One of the fluid inlet connectors 61 is selected by the selector valve 6 to be in communication with the fluid outlet connector 62, so that the reagent bottle 5 in communication with the fluid inlet connector 61 is in communication with the sample addition pump 4, and the sample addition pump 4 can pump the reagent inside the reagent bottle 5 into the interior of the sample addition mechanism.

The fully automatic immunohistochemistry stainer is provided with multiple staining areas and multiple sample addition mechanisms therein, therefore, each of the sample addition mechanisms has to be equipped with one fluid path module. When there are multi groups of the fluid path modules, due to the communication between the selector valve, reagent bottles and sample addition pump via communicating pipes, a large amount of the communicating pipes will be heaped inside the fully automatic immunohistochemistry stainer. In addition, when adopting multi groups of the fluid path modules, mounting the fluid path modules will lead to a huge entire volume of the fully automatic immunohistochemistry stainer. Further, due to the use of usually hoses, which tends to bend, as the communicating pipes, when the number communicating pipes is large, the heaping of the communicating pipes tends to causes the occurrence of folding and cutting off due to squeezing with each other, which in turn incurs the occurrence of failing to provide the sample addition mechanism with a reagent.

SUMMARY

In view of the deficiency of the existing technology, one of the purposes of the present application is to provide a multi fluid path selector valve, in which the fluid inlet pipe thereof can be fed with a variety of reagents, and the reagent as needed can be selectively fed from a specified outlet pipe according to actual reagent demand.

The above purpose of the present application is realized by adopting the following technical solution:

a multi fluid path selector valve includes a valve body provided with several fluid outlet pipes, and provided with several layers of branch channels therein along a height direction of the valve body. The branch channel includes a fluid inlet hole and several branch holes in communication with the fluid inlet hole, in which the number of the branch holes matches with that of the fluid outlet pipes. Communication holes for one-to-one communicating the branch holes with the fluid outlet pipes are provided inside the valve body. The valve body is provided with a control mechanism to control the on or off state between the branch hole and communication hole. The valve body is provided with fluid inlet pipes in communication with the fluid inlet holes of each layer of the branch channels respectively.

In the above technical solution, the fluid inlet pipe of the branch channel in each layer in the valve body is in communication with reagent bottles containing various reagents, and the fluid outlet pipes in the valve body are all in communication with the sample addition device. The control mechanism in the valve body controls the on or off state between the corresponding branch hole and communication hole, so that the needed reagent can be released from the specified outlet pipe according to actual demand, which realizes the demand of feeding multiple sample addition devices with various types of reagents via one multi fluid path valve body.

Further, the control mechanism includes a mounting hole in communication with the branch hole, and the mounting hole and the branch hole are disposed at two sides of the communication hole respectively. A plug is provided in the interior of the mounting hole, which can fit into the interior of the branch hole for blocking the branch hole. The valve body is provided with a control member for driving the plug to move toward the interior of the branch hole.

In the above technical solution, a control member is used to push the plug to block the branch hole. This structure is simple and facilitates the integral installation and production of the valve body.

Further, the branch holes of the branch channels in each layer are in one-to-one correspondence to the branch holes of the branch channels in an upper layer in the vertical direction, the communication holes in the branch channels in a lower layer are in one-to-one correspondence to and in communication with those in an upper layer, and the communication holes in the branch channels in the top layer are in communication with the fluid outlet pipes respectively.

In the above technical solution, the communication holes are in communication with each other in the vertical direction to form one integral hole. During machining, the communication holes of branch channel in each layer can be integrally formed by drilling using a drill bit, which facilitates the production of the valve body.

A second purpose of the present application is to provide an integrated multichannel fluid path module, which can reduce the number of the communicating pipes as used in the entire multichannel fluid path module, and avoid the occurrence of folding or cutting of the communicating pipes during installation due to excessive number of communicating pipes, while reducing the occupied space and volume of the entire fluid path module.

The above purpose of the present application is realized by adopting following technical solution:

an integrated multichannel fluid path module with a multi fluid path selector valve includes a mounting base on which the multi fluid path selector valve is mounted. The mounting base is provided with sample addition pumps having a number matching that of the fluid outlet pipes. The fluid pipe is in communication with the fluid inlet of the sample addition pump. The sample addition pump is provided with a drain pipe at the outlet of the sample addition pump.

In the above technical solution, the fluid inlet pipes of the multi fluid path selector valve are in communication with various reagents respectively. The fluid outlet pipes of the multi fluid path selector valve are connected to the sample addition pumps respectively. By controlling the on and off state between the branch hole and the communication hole in each layer of the branch channels, a specified fluid inlet pipe is selectively in communication with the fluid outlet pipe to realize the communication between multiple reagents and multiple sample addition pumps using one valve body, so as to reduce the amount of the used communicating pipes and reduce the occurrence of folding or cutting off of the communicating pipes due to excessive communicating pipes. In addition, since the number of the communicating pipes is reduced, only one multi fluid path selector valve is needed, thereby reducing the occupied space volume of the entire fluid path module.

Further, the valve body is in detachable connection with the mounting base.

In the above technical solution, the multi fluid path valve can be detached and replaced when it fails.

Further, the mounting base is provided with a socket therein, the valve body is provided with an inserting rod at the bottom thereof, the inserting rod is provided with a mounting groove at the side wall thereof, and an elastic member is provided inside the mounting groove, which is wholly positioned inside the mounting groove in a compressed state, and is stretched out of the mounting groove to abut against the back side of the mounting base in a free state.

In the above technical solution, the valve body can be quickly fixed on the mounting base. For mounting the valve body, first, the elastic member is pressed into the interior of the mounting groove, and then the inserting rod is inserted through the socket. After the position of the mounting groove passes through the socket, the elastic member inside the socket is stretched out to abut against the back side of the mounting base, so as to fix the valve body to the mounting base.

Further, the socket is a polygonal hole, and the cross-sectional shape of the inserting rod matches the shape of the socket.

In the above technical solution, it can limit the inserting rod not to rotate in the socket, so as to avoid the rotation of the multi fluid path selector valve during using.

Further, the valve body is provided with a fixing plate attached to the front side of the mounting base at the bottom thereof. And the fixing plate is connected to the mounting base via a blot.

In the above technical solution, the fixing plate is fixed to the mounting base via the blot, which can ensure the connection strength between the multi fluid path selector valve and the mounting case, and ensure that there will be no loosening after the fixing plate and mounting base are fixed.

Further, an elastic buffering member is provided between the valve body and the mounting base.

During the operation of the multi fluid path selector valve, a slight vibration will be produced when the reagent fluid flows through the interior of the valve body. In the above technical solution, The buffering member can protect the valve body to avoid a damage from the vibration between the valve body and mounting base.

Further, the mounting base is provided with a mounting rack. The mounting rack is provided with a fixing base parallel to the mounting base and supporting legs connected with the mounting base. The distance between the fixing base and the mounting base is larger than the distance between the top of the valve body and the mounting base. The sample addition pump is mounted on the fixing base.

In the above technical solution, when the fluid outlet pipe is in communication with the fluid inlet of the sample addition pump, the fluid outlet pipes are hung in the air to avoid the heaping of fluid outlet pipes in the mounting base.

In summary, the present application can achieve at least one of the following beneficial technical effects.

1. The present application provides a multi fluid path selector valve. In the valve, the fluid inlet pipes of each layer of branch channels can be in communication with reagent bottles with various reagents, and the fluid outlet pipes of the valve body are in communication with sample addition devices respectively. The control mechanism in the valve body controls the on or off state between the corresponding branch hole and communication hole, so that the required reagent can be fed from the specified outlet pipe according to actual demand. This addresses the demand of feeding multiple sample addition devices with various types of reagents via one multi fluid path valve body.
2. The present application further provides an integrated multichannel fluid path module, in which the fluid inlet pipes are in communication with various reagent respectively, and the fluid outlet pipes of the multi fluid path selector valve are connected to the sample addition pumps respectively. By controlling the on or off state between the branch hole and the communication hole in each layer branch channel, a specified fluid inlet pipe is selectively in communication with the fluid outlet pipe to realize the communication between multiple reagents and multiple sample addition pumps using one valve body, so as to reduce the number of the used communicating pipes and reduce the occurrence of folding or cutting off of the communicating pipes due to excessive number of communicating pipes. In addition, since the number of the communicating pipes are reduced, and only one multi fluid path selector valve is needed, the occupied space volume of the entire fluid path module can be reduced.

DETAILED DESCRIPTION

The application will be further described in detail below in combination with figures.

Embodiment 1

Figure 2:
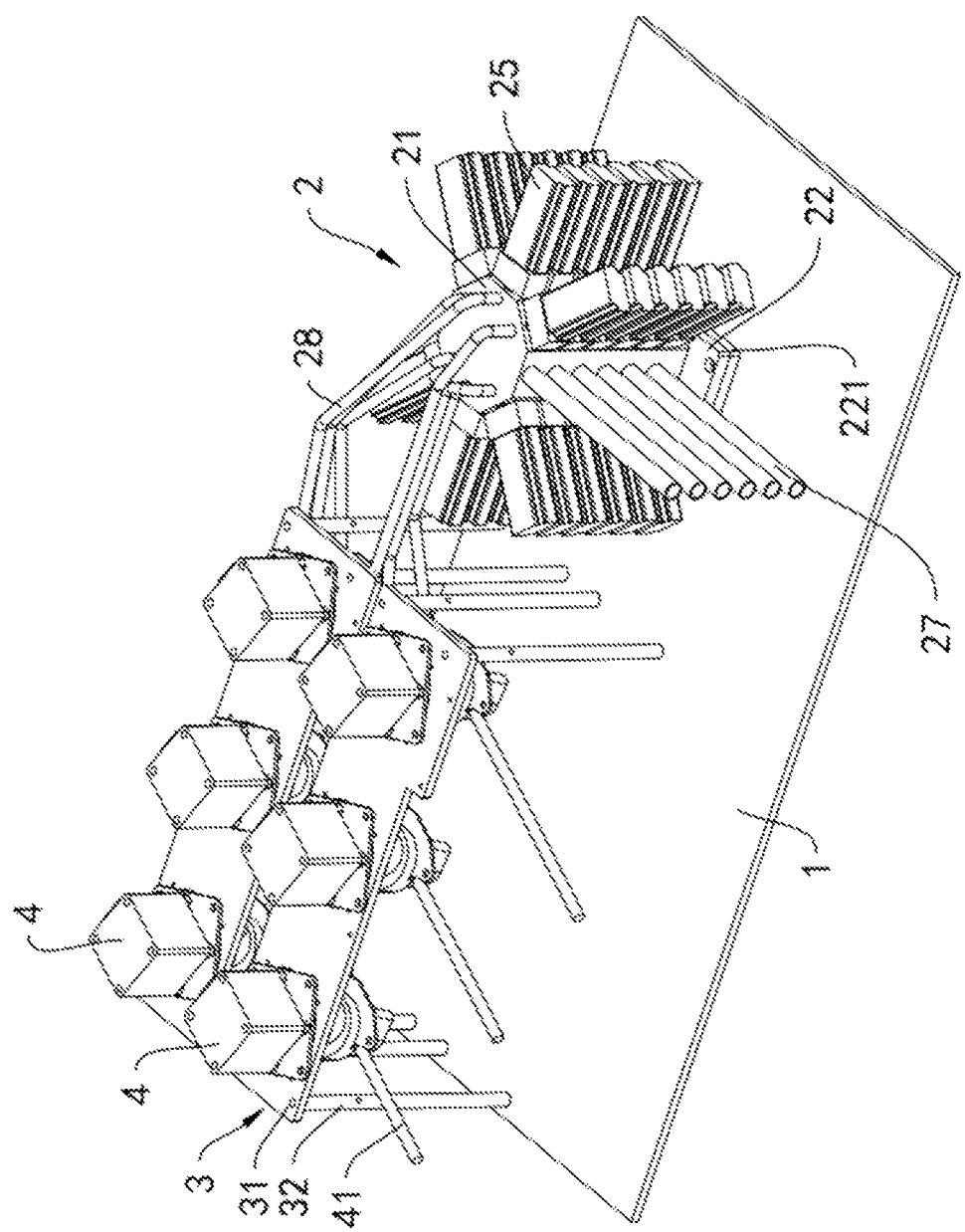
FIG. 2 is a structural diagram of Embodiment 1.

Referring to FIG. 2, the present application provides an integrated multichannel fluid path module, including a mounting base 1, which is a rectangle plate in this embodiment. One side of the mounting base 1 is the front side and another side is the back side. The mounting base 1 is provided with a multi fluid path selector valve 2, two mounting rack 3 and multiple sample addition pumps 4, which are mounted in two mounting rack 3, at the front side thereof.

The mounting rack 3 includes a fixing base 31 parallel to the mounting base 1, in which the distance between the fixing base 31 and the mounting base 1 is larger than the distance between the end of the multi fluid path selector valve 2 away from the mounting base 1 and the mounting base 1. The fixing base 31 adopts a rectangle plate body. The fixing base 31 is provided with supporting legs extending towards the mounting base 1 at four corners thereof, and two ends of the supporting leg 32 are welded to the fixing base 31 and mounting base 1 respectively. The sample addition pump 4 is arranged on the fixing base 31. In some embodiments, the number of the sample addition pump 4 is six, and each group of three pumps is mounted on one mounting rack 3.

Figure 3:
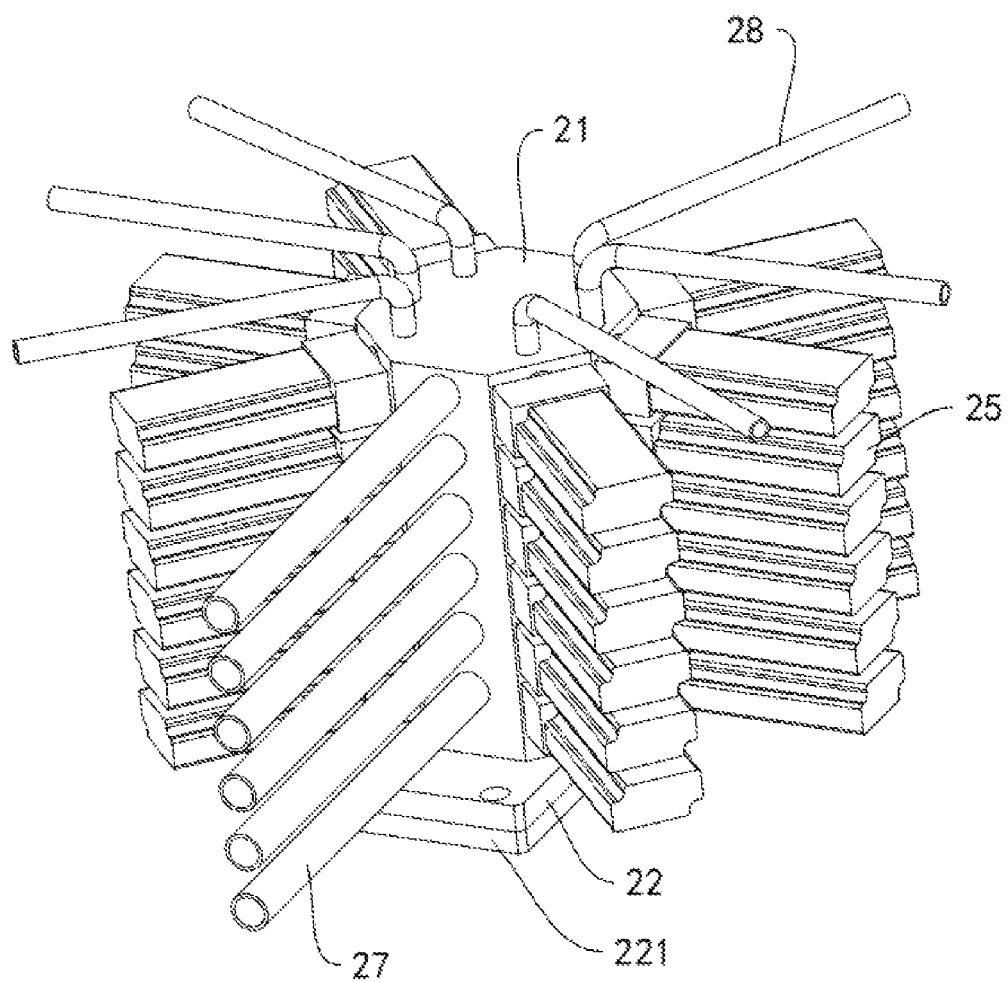
FIG. 3 is a structural diagram of the multi fluid path selector valve.

Referring to FIG. 3, the multi fluid path selector valve 2 includes a valve body 21 perpendicular to the front side of the mounting base 1. The valve body 21 is provided with a fixing plate 22 attached to the front side of the mounting base 1 and fixedly connecting with the mounting base 1 by a blot at the bottom thereof, in which the fixing plate 22 and valve body 21 are integrally connected. The mounting base 1 is provided with a rubber pad 221 on the side of the fixing plate 22 facing the mounting base 1, in which the rubber pad 221 is adhered to the fixing plate 22.

Figure 4:
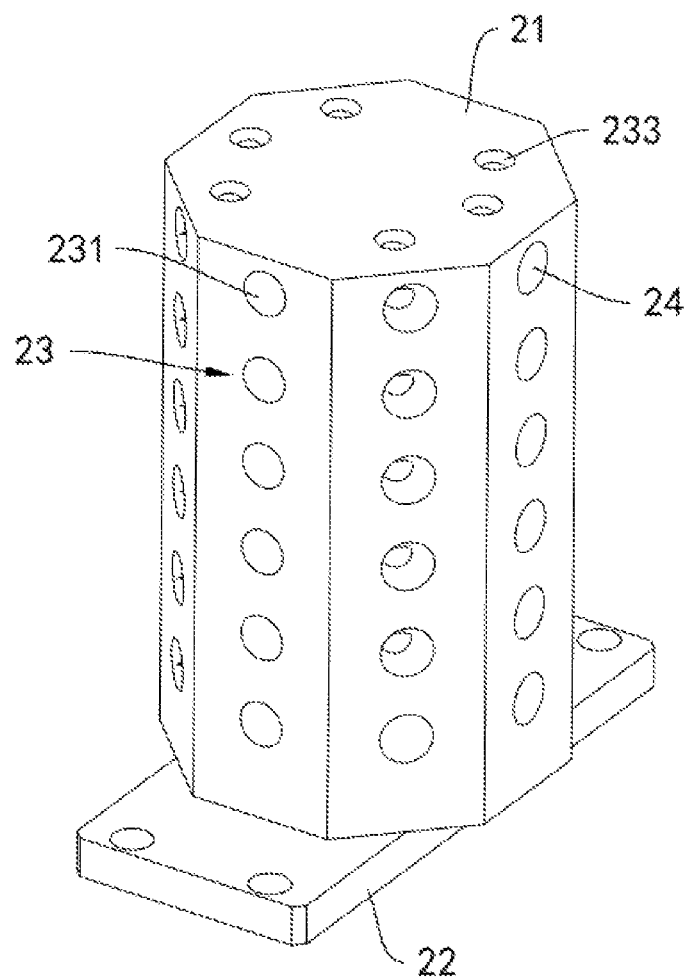
FIG. 4 is a structural diagram of the valve body.
Figure 5:
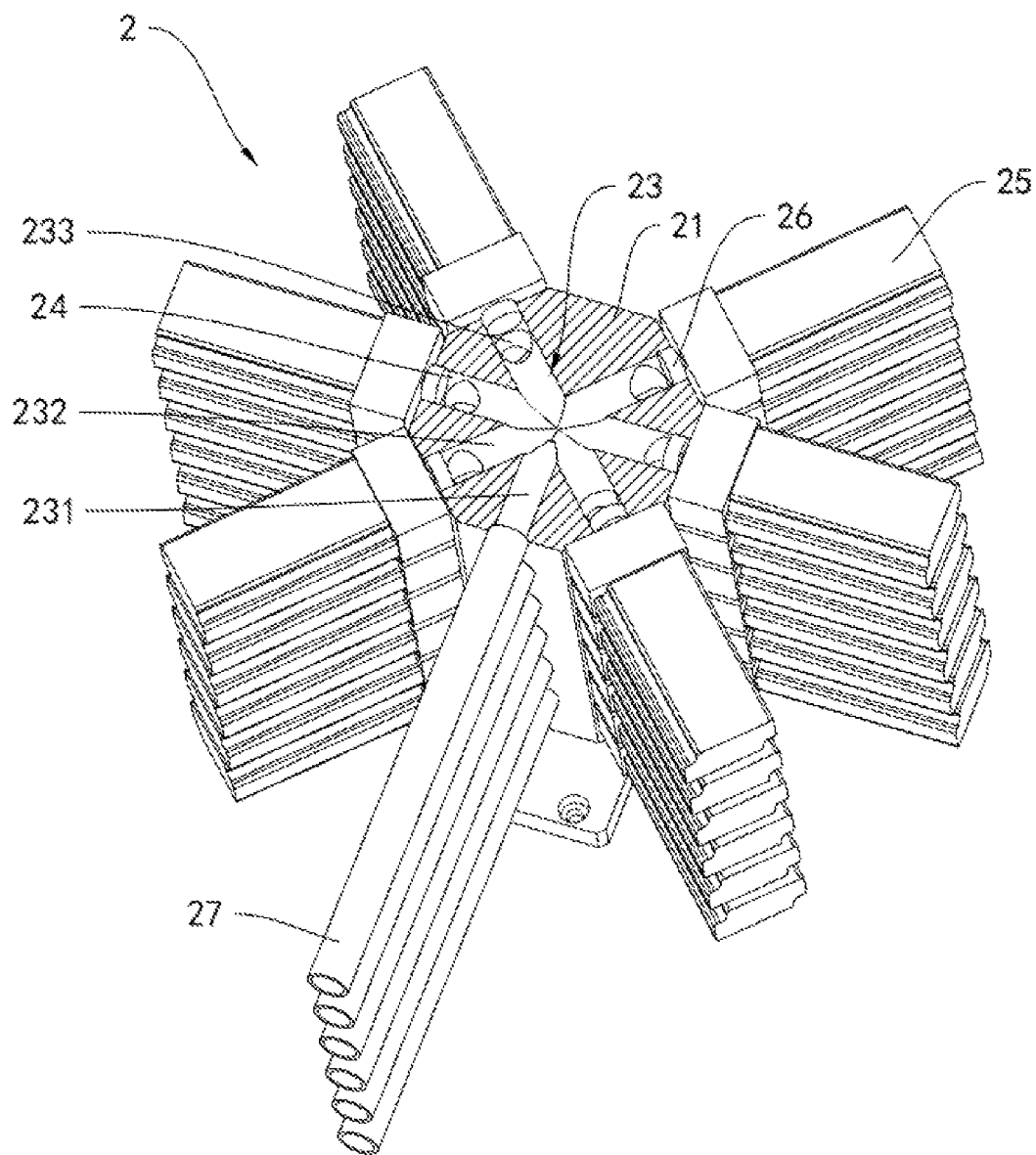
FIG. 5 is a cross-sectional diagram of the valve body to indicate a structural diagram of the branch channel.

Referring to FIG. 4 and FIG. 5, the valve body 21 is provided with several spaced branch channels 23 from bottom to top therein. The branch channel 23 includes a fluid inlet hole 231, which is in communication with the outer side of the valve body 21, and several branch holes 232, which are in communication with the fluid inlet hole 231, and is provided with a communication hole 233 upwards in the vertical direction at one end of the branch hole 232 away from the fluid inlet hole 231. The communication hole 233 of the top layer branch channel 23 is through the top surface of the valve body 21.

Figure 6:
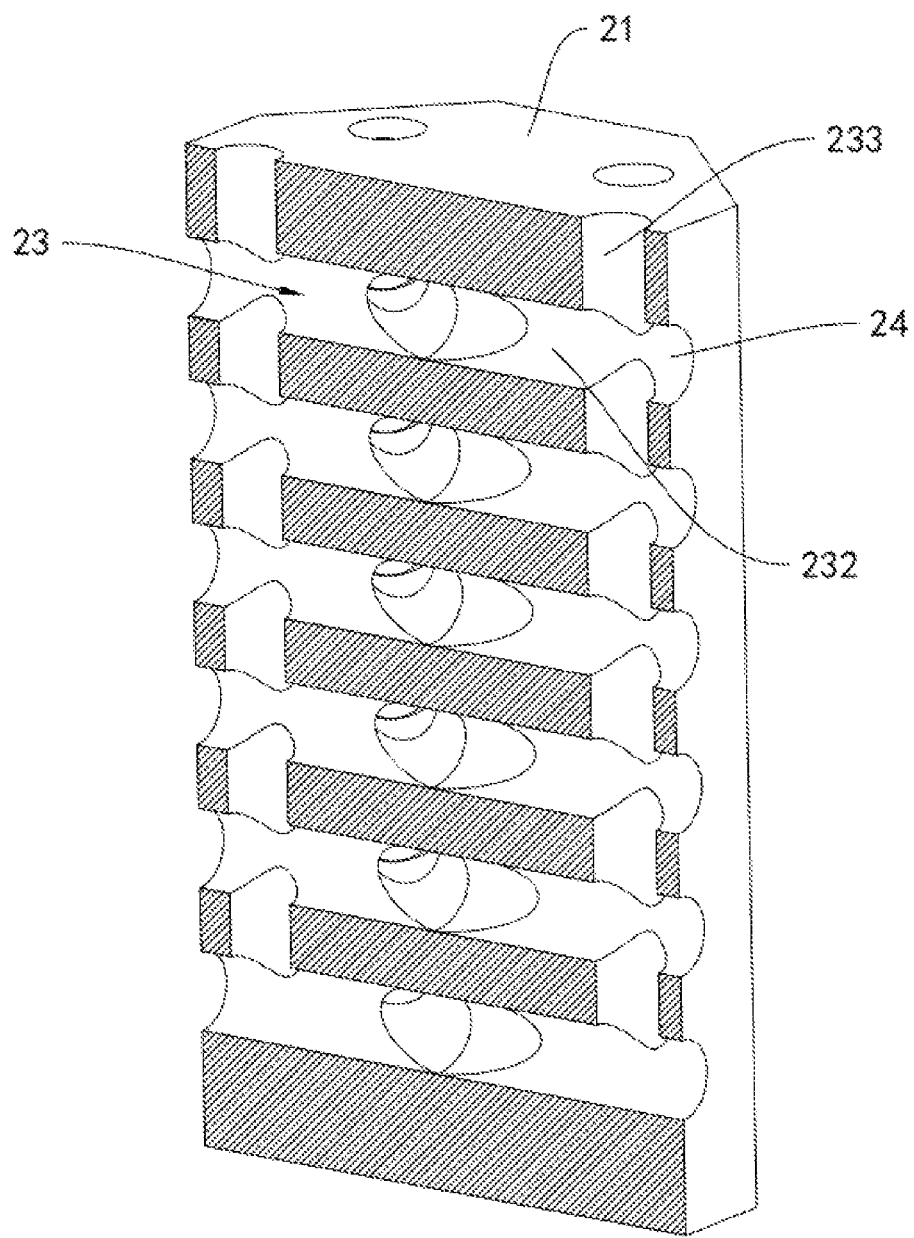
FIG. 6 is a vertical-sectional diagram of the valve body to indicate a communication relationship diagram between the branch holes of each layer branch channel and the communication hole.

Referring to FIG. 6, the fluid inlet holes 231 in a lower layer branch channel 23 are in one-to-one correspondence with the fluid inlet holes 231 of an upper layer branch channel 23 in the vertical direction. The communication holes 233 in a lower layer branch channel 23 is in one-to-one correspondence and communication with the communication holes 233 in an upper layer branch channel 23.

Referring to FIGS. 5 and 6, the valve body 21 is provided with mounting holes 24, which are in one-to-one correspondence and communication with the branch holes 232, in which the mounting hole 24 and the branch hole 232 are positioned at two sides of the communication hole 233 respectively. The end of the mounting hole 24 away from the branch hole 232 runs through the side wall of the valve body 21. The diameter of the mounting hole 24 equals to that of the branch hole 232, and the mounting hole 24 and the branch hole 232 are coaxial with each other. For producing the communication hole 233 and mounting hole 24, they are integrally formed by drilling by a drill bit.

The valve body 21 is provided with straight-through piston solenoid valves 25, which are in one-to-one correspondence with the mounting hole 24. The body of the straight-through piston solenoid valve 25 is fixedly connected on the side wall of the valve body 21, the piston of which extends into the interior of the mounting hole 24. A plug 26 is provided inside the mounting hole 24, which can slide in the mounting hole 24 for blocking the branch hole 232, in which the piston of the straight-through piston solenoid valve 25 is fixedly connected with the plug 26. When the piston of the straight-through piston solenoid valve 25 is stretch out, the plug 26 wholly extends into the interior of the branch hole 232 with the movement of the piston to block the branch hole 232. When the piston of the straight-through piston solenoid valve 25 is in retraction state, the plug 26 is positioned in the mounting hole 24 to bring the branch hole 232 in communication with the communication hole 233.

Referring to FIGS. 4 and 5, the valve body 21 is provided with fluid inlet pipes 27 having the same number as that of the branch holes 23. The fluid inlet pipes 27 are in communication with the fluid inlet holes 231 of each layer branch channel 23 respectively. One end of the fluid inlet pipe 27 is inserted into the interior of the fluid inlet hole 231, in which the fluid inlet pipe 27 is hermetically and fixedly connected to the valve body 21, and the other end of the fluid inlet pipe 27 is the fluid inlet end thereof.

Referring to FIGS. 3 and 4, the valve body 21 is provided with fluid outlet pipes 28 in the consistent amount with the communication holes 233 of each layer branch channel 23, and the fluid outlet pipes 28 are in one-to-one correspondence and in communication with the communication hole 233 of the top layer branch channel 23. The fluid outlet pipe 28 is in communication with the communication hole 233 and is hermetically and fixedly connected to the valve body 21.

Figure 1:
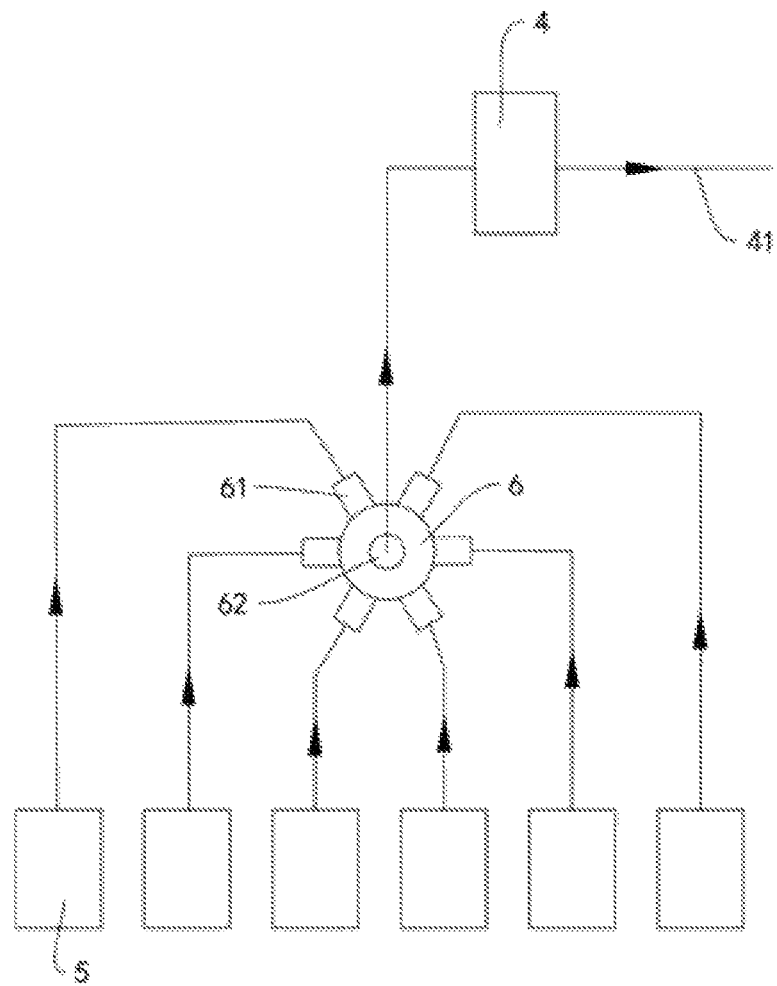
FIG. 1 is a schematic diagram of the existing technology.

Referring to FIG. 1, the end of the fluid outlet pipe 28 away from the valve body 21 is hermetically connected with the fluid inlet of the sample addition pump 4, so as to bring the fluid outlet pipe 28 in communication with the sample addition pump 4. The sample addition pump 4 is provided with a drain pipe 41 at the fluid outlet thereof, one end of which is hermetically connected with the fluid outlet of the sample addition pump 4, and the other end of which is the fluid outlet of the drain pipe 41.

The implementation principle of the present application is: the fluid inlet pipes 27 are in communication with reagent bottles containing various reagents respectively. When the reagent is to be added, the corresponding sample addition pump 4 and the corresponding straight-through piston solenoid valve 25 on the valve body 21 corresponding to the sample addition pump 4 and reagent bottle are opened, so as to communicate the corresponding branch hole 232 with the communication hole 233. After the branch hole 232 and communication hole 233 are in communication with each other, the reagent in the reagent bottle can be pumped by the sample addition pump 4 to the drain pipe 41 and be drained through the fluid outlet of the drain pipe 41, so as to realize the delivery of the reagent.

Embodiment 2

Figure 7:
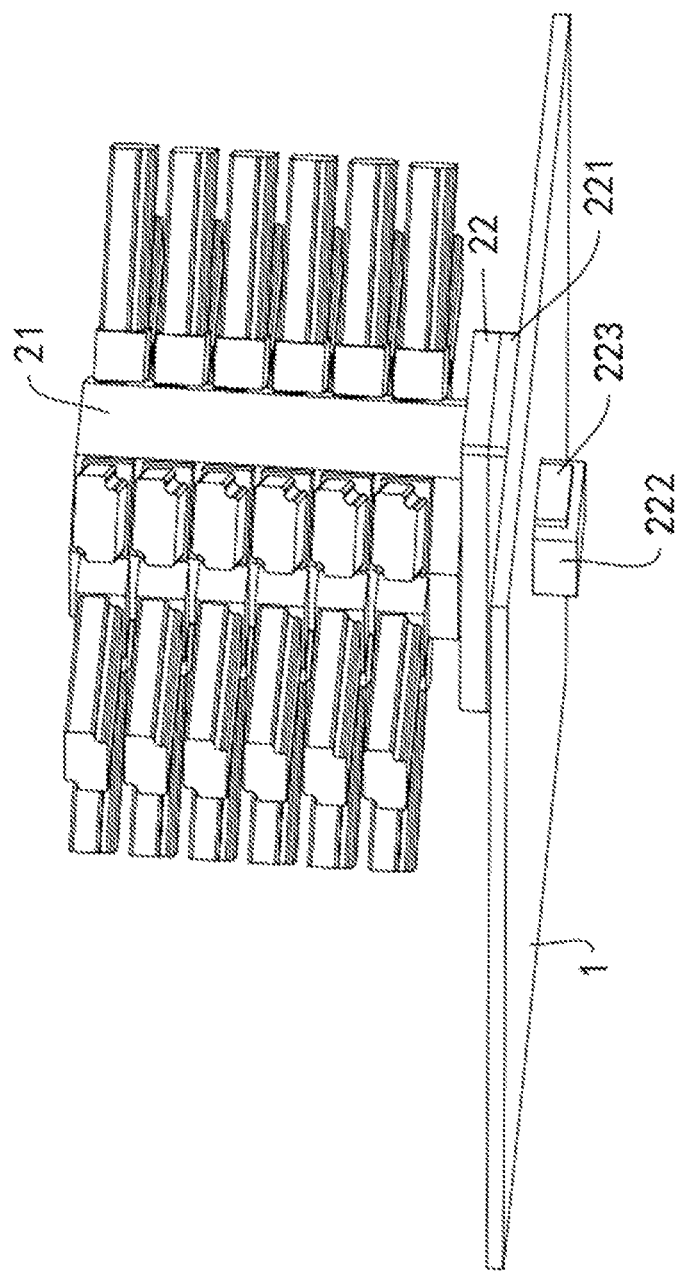
FIG. 7 is a structural diagram of Embodiment 2.
Figure 8:
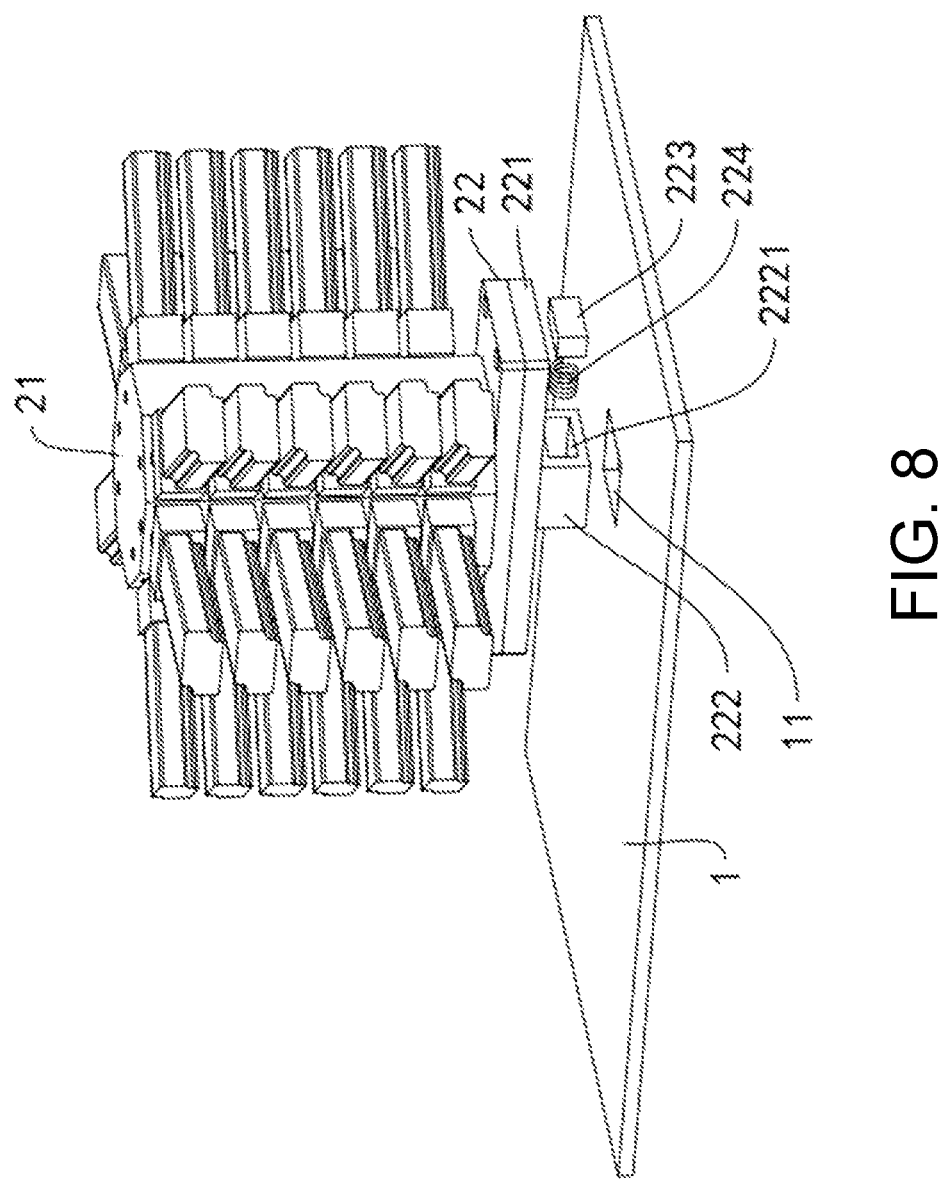
FIG. 8 is an explosion diagram of the connecting structure between the valve body and the mounting base.

Referring to FIGS. 7 and 8, the present application provides an integrated multichannel fluid path module. Embodiment 2 differs from the Embodiment 1 in the connection mean of the valve body 21 with the mounting base 1. The mounting base 1 is provided with a rectangle socket 11 running through mounting base 1 at the front side thereof. The fixing plate 22 is provided with an inserting rod 222, the shape of which conforms to the shape of the socket 21 on the side surface towards the mounting base 1. The inserting rod 222 is fixedly connected with the fixing plate 22. The inserting rod 222 is provided with a mounting groove 2221 on the side wall thereof, which is a rectangle groove. The distance between one side of the mounting groove 2221 facing the fixing plate 22 matches the thickness of the mounting base 1. After the inserting rod 222 is inserted through the socket 11 and the fixing plate 22 is attached to the front surface of the mounting base 1, the groove side wall of the mounting groove 2221 facing the fixing plate 22 is flush with the back side of the mounting base 1.

A locking block 223 is in slidable connection in the mounting groove 2221. A spring 224 is provided between the groove bottom of the mounting groove 2221 and the locking block 223. Two ends of the spring 224 are fixedly connected with the bottom wall of the mounting groove 2221 and the locking block 223 respectively. When the spring 224 is compressed, the locking block 223 can be wholly pushed into the mounting groove 2221. When the spring 224 is in free state, a portion of the locking block 223 is positioned the mounting groove 2221 and the other portion is extended out of the mounting groove 2221, and the portion extended out of the mounting groove 2221 abuts against the back side of the mounting base 1.

For mounting the valve body 21, first, the locking block 223 is pressed into the interior of the mounting groove 2221, then the inserting rod 222 is inserted through the socket 11 until the fixing plate 22 is attached to the frond side of the mounting base 1, by which the mounting groove 2221 is positioned outside the back side of the mounting base 1. The locking block 223 is pressed out of the mounting groove 2221 under the elastic force of the spring 224 and abut against the back side of the mounting base 1, so as to fix the valve body 21 to the mounting base 1.

The above are the preferred embodiments of the present application, which are not intend to limit the protection scope of the present application. Therefore, all equivalent changes made according to the structure, shape and principle of the present application should be covered within the protection scope of the present application.

What is claimed is:

1. A multi fluid path selector valve, comprising
a valve body provided with at least two fluid outlet pipes and at least two layers of branch channels along a height direction of the valve body,
wherein each branch channel of the at least two layers of branch channels comprises a fluid inlet hole and at least two branch holes in communication with the fluid inlet hole, a number of the at least two branch holes matching that of the at least two fluid outlet pipes;
communication holes for one-to-one communicating the at least two branch holes with the at least two fluid outlet pipes are provided inside the valve body;
the valve body is provided with a control mechanism to control an on or off state between each of the at least two branch holes and a corresponding one of the communication hole; and
the valve body is provided with fluid inlet pipes in communication with the fluid inlet holes of each of the at least two layers branch channels, respectively.

2. The multi fluid path selector valve according to claim 1, wherein the control mechanism comprises mounting holes in one-to-one correspondence to and in communication with the at least two branch holes, each of the mounting holes and a corresponding branch hole of the at least two branch holes are disposed at two sides of the corresponding one of the communication holes, respectively;
a plug is provided inside each of the mounting holes and is configured to fit into the corresponding branch hole for blocking the at least two branch holes; and
the valve body is provided with a control member for driving the plug to move toward an interior of the at least two branch holes.

3. The multi fluid path selector valve according to claim 1, wherein branch holes of the at least two branch holes of each layer of the at least two layers of branch channels are in one-to-one correspondence to branch holes of the at least two branch holes of an upper layer of the at least two layers of branch channels in a vertical direction, communication holes of the communication holes in a lower layer of the at least two layers of branch channels are in one-to-one correspondence to and in communication with communication holes of the communication holes in an upper layer of the at least two layers of branch channels, and communication holes of the communication holes in an uppermost layer of the at least two layers of branch channels are in communication with the at least two fluid outlet pipes respectively.

4. An integrated multichannel fluid path module having the multi fluid path selector valve according to claim 1, comprising
a mounting base, wherein the multi fluid path selector valve is mounted on the mounting base, the mounting base is provided with at least two sample addition pumps, a number of the at least two sample addition pumps matching that of the at least two fluid outlet pipes, each of the at least two fluid outlet pipes is in communication with a fluid inlet of a corresponding one of the at least two sample addition pumps, and each of the at least two sample addition pumps is provided with a drain pipe at a fluid outlet of the sample addition pump.

5. The integrated multichannel fluid path module according to claim 4, wherein an elastic buffering member is provided between the valve body and the mounting base.

6. The integrated multichannel fluid path module according to claim 4, wherein the mounting base is provided with a mounting rack, the mounting rack comprises a fixing base parallel to the mounting base and a supporting leg connected with the mounting base, a distance between the fixing base and the mounting base is larger than a distance between a top end of the valve body and the mounting base, and the at least two sample addition pumps are mounted on the fixing base.

7. The integrated multichannel fluid path module according to claim 4, wherein the valve body is in detachable connection with the mounting base.

8. The integrated multichannel fluid path module according to claim 7, wherein the valve body is provided with a fixing plate attached to a front side of the mounting base at a bottom of the mounting base, and the fixing plate is connected to the mounting base via a bolt.

9. The integrated multichannel fluid path module according to claim 7, wherein the mounting base is provided with a socket in the mounting base, the valve body is provided with an inserting rod at a bottom of the valve body, the inserting rod is provided with a mounting groove at a side wall of the inserting rod, and an elastic member is provided inside the mounting groove, the elastic member being wholly positioned inside the mounting groove in a compressed state and being stretched out of the mounting groove to abut against a back side of the mounting base in a free state.

10. The integrated multichannel fluid path module according to claim 9, wherein the socket is a polygonal hole, and a cross-sectional shape of the inserting rod matches a shape of the socket.

* * * * *